US012475445B2

(12) United States Patent
Olenoski (10) Patent No.: US 12,475,445 B2
(45) Date of Patent: *Nov. 18, 2025

(54) USER REGISTRATION BASED ON UNSUPERVISED LEARNING CLASSIFICATION

(71) Applicant: Capital One Services, LLC, McLean, VA (US)

(72) Inventor: Michelle S. Olenoski, Washington, DC (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/503,218

(22) Filed: Nov. 7, 2023

(65) Prior Publication Data

US 2024/0144216 A1 May 2, 2024

Related U.S. Application Data

(63) Continuation of application No. 16/871,731, filed on May 11, 2020, now Pat. No. 11,847,624.

(51) Int. Cl.
*G06Q 20/12* (2012.01)
*G06F 18/214* (2023.01)
(Continued)

(52) U.S. Cl.
CPC ......... *G06Q 20/12* (2013.01); *G06F 18/2148* (2023.01); *G06N 20/00* (2019.01); *G06Q 20/341* (2013.01); *G06Q 20/4093* (2013.01)

(58) Field of Classification Search
CPC .. G06Q 20/12; G06Q 20/341; G06Q 20/4093; G06Q 20/385; G06F 18/2148; G06N 20/00
See application file for complete search history.

(56) References Cited

U.S. PATENT DOCUMENTS 6,000,832 A 12/1999 Franklin et al.
8,103,615 B2 * 1/2012 Fogel ..................... G06N 20/00
706/62

(Continued)

FOREIGN PATENT DOCUMENTS

WO 2018204822 A1 11/2018

OTHER PUBLICATIONS

Asaf Darash, Automated Online Registration—3 Reasons You Should be Doing It, Webpage Blog: Regpack, 8 pages, Retreived May 8, 2020 from: <https://www.regpacks.com/blog/automated-registration-3-reasons-why-you-should-be-doing-it/>.

(Continued)

*Primary Examiner* — Patrick Mcatee
*Assistant Examiner* — Vincent I Idiake
(74) *Attorney, Agent, or Firm* — Banner & Witcoff, Ltd.

(57) ABSTRACT

Aspects described herein may relate to methods, systems, and apparatuses for applying machine learning techniques as part of registering, for a user, a payment card with at least one account of a merchant. The machine learning technique may be an unsupervised learning classifier that is configured to determine classifications of merchant groups and/or user groups. Based on a classification, the user may be able to select which merchants to register the payment card. Based on the selection, the payment card may be registered with the user's account at the selected merchants. Further, the registration may be performed based on virtual payment card information configured for use with the merchant. The virtual payment card information may be configured to initiate transactions only with the merchant.

20 Claims, 5 Drawing Sheets

(51) Int. Cl.
*G06N 20/00* (2019.01)
*G06Q 20/34* (2012.01)
*G06Q 20/40* (2012.01)

(56) References Cited

U.S. PATENT DOCUMENTS

| | | | |
|---|---|---|---|
| 8,458,074 B2 | 6/2013 | Showalter | |
| 8,651,374 B2 | 2/2014 | Brabson et al. | |
| 9,189,746 B2 | 11/2015 | Zhu et al. | |
| 10,497,372 B1 | 12/2019 | Vukich et al. | |
| 11,270,312 B1* | 3/2022 | Jass | G06Q 30/0201 |
| 2011/0166922 A1* | 7/2011 | Fuerstenberg | G07G 1/0036 |
| | | | 705/14.1 |
| 2011/0302084 A1 | 12/2011 | Melik-Aslanian et al. | |
| 2014/0214654 A1* | 7/2014 | Greenbaum | G06Q 20/321 |
| | | | 705/39 |
| 2017/0091664 A1 | 3/2017 | Sanchez et al. | |
| 2017/0116635 A1* | 4/2017 | Gantert | G06Q 30/0226 |
| 2019/0279178 A1* | 9/2019 | Gupta | G06Q 20/102 |
| 2020/0058031 A1 | 2/2020 | Zhang et al. | |
| 2020/0118187 A1 | 4/2020 | Benkreira et al. | |
| 2020/0265473 A1* | 8/2020 | McDonough | G06Q 30/0257 |
| 2021/0065156 A1* | 3/2021 | Kadiwala | G06Q 20/363 |
| 2021/0201404 A1* | 7/2021 | Schwartz | G06N 20/00 |

OTHER PUBLICATIONS

Corey Wainwright, 12 Ways to Create a User-Friendly Website Registration Process, Webpage Blog: Hubspot, 15 pages, Retrieved May 8, 2020 from: <https://blog.hubspot.com/blog/tabid/6307/bid/31517/12-ways-to-create-a-user-friendly-website-registration-process.aspx>.

Sanatan Mishra, Unsupervised Learning and Data Clustering, Webpage: towards data science, May 19, 2017, 15 pages, Retrieved May 8, 2020 from: <https://towardsdatascience.com/unsupervised-learning-and-data-clustering-eeecb78b422a>.

Brendan Harkness, Stay Secure Online with Virtual Credit Card Numbers, Webpage: Credit Card Insider, 23 pages, Retrieved May 8, 2020 from: <https://www.creditcardinsider.com/blog/virtual-credit-cards/>.

Oct. 7, 2021—(EP) Extended European Search Report—App. No. 21173374.6.

Jul. 11, 2025—(EP) Examination Report—App No. 21173374.6.

* cited by examiner

USER REGISTRATION BASED ON UNSUPERVISED LEARNING CLASSIFICATION

CROSS-REFERENCE TO RELATED APPLICATION(S)

This application is a continuation of co-pending U.S. application Ser. No. 16/871,731, which was filed on May 11, 2020. The above-identified application is hereby incorporated by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many people today purchase goods and services online at various merchant websites. For example, in a single day, a person might buy a book at an online bookstore, order groceries from a local grocer via the grocer's web site, and purchase clothing from an online retailer. As a person makes more and more purchases online, payment card information may, as part of registering an account with a merchant website, need to be entered at each newly visited merchant website. The need to enter the payment card information at newly visited merchant websites may diminish the person's online experience with both the payment card and the merchant website. Further, as a person makes more and more purchases online, managing the accounts at the various merchant websites may get more difficult. For example, if the person makes a change to a new payment card, each account may need to be updated with the new payment card's information. The need to update accounts with the payment card information may diminish the person's online experience with both the payment card and the merchant website. Even further, as a person makes more and more purchases online, there may be an increased risk of the payment card's information being stolen or known by third parties. This increased risk may diminish the person's online experience with both the payment card and the merchant website. Thus, there is an ever-present need to improve to improve the online experience of payment cards and merchant websites.

SUMMARY

The following presents a simplified summary of various aspects described herein. This summary is not an extensive overview, and is not intended to identify key or critical elements or to delineate the scope of any claim. The following summary merely presents some concepts in a simplified form as an introductory prelude to the more detailed description provided below.

Aspects described herein may provide one or more improvements in the online experience of payment cards and merchant websites based on the application of machine learning techniques. Further, may improve the online experience of payment cards and merchant websites in other ways including, for example, by the use of virtual payment card information.

Aspects described herein may relate to applying machine learning techniques as part of registering a payment card with one or more accounts of one or more merchants. For example, an unsupervised learning classifier may be trained to determine classifications indicating merchant groups and/or classifications indicating user groups. These classifications may be based on types of payment cards, category codes associated with merchants, spending information associated with users, demographic information associated with users, types of devices associated with users, and the like. After the unsupervised learning classifier is trained, the unsupervised learning classifier may be used as part of a process for registering a user's payment card with a merchant. For example, the unsupervised learning classifier may be used to determine, based on the payment card associated with a user, a classification indicative of a merchant group and/or a user group. A merchant group may, based on the classification, indicate one or more merchants that are recommended for registration. A user group may, based on the classification, indicate one or more users that have similar preferences as the user. The user group may be associated with a listing of merchants that are recommended for registration. Based on the classification, the user may be able to select which merchants to register the payment card. Based on the selection, the payment card may be registered with the user's account at the selected merchants.

Additional aspects described herein may relate to the use of virtual payment card information. For example, the registration of the payment card with the user's account at a merchant may be performed based on the virtual payment card information. The virtual payment card information may be configured to initiate transactions only with the merchant. In this way, if the virtual payment card information is used in an attempt to initiate a transaction with a different merchant, the payment card issuer may deny the transaction. Further, the virtual payment card information may be different from an identifier of the payment card. As one example, the virtual payment card information may not include a number of the payment card. In this way, if the virtual payment card information is provided to a third party, the third party may not gain knowledge of the number of the payment card.

These features, along with many others, are discussed in greater detail below. Corresponding apparatus, systems, and computer-readable media are also within the scope of the disclosure.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As a general introduction, a payment card may be any card for performing purchase transactions including, for example, credit cards and debit cards. A payment card issuer may issue the payment card and manage transactions involving the payment card (e.g., purchases of goods or services using the payment card). When a user is issued a payment card, an account with the payment card issuer may be established that associates the user and the payment card. The payment card may include an identifier, such as a number, that is unique to the payment card. The identifier may identify both the payment card issuer and the user's account with the payment card issuer. Using the identifier, and other information associated with the payment card (e.g., expiration date, security code), the user may be able to initiate a transaction with a merchant to purchase a good or service. A merchant may have an online store or online location (e.g., a website) where the user can visit to initiate the transaction. Non-limiting examples of goods or services that a user could purchase include physical or digital books, clothes, digital music, a subscription to a data or content service, and the like.

By way of further introduction, aspects discussed herein may relate to methods and systems that apply machine learning techniques as part of registering a payment card with a merchant and/or the use of virtual payment card information when registering the payment card. One example of applying the machine learning techniques includes the use of an unsupervised learning classifier as part of registering the payment card with a merchant. Continuing the example, an unsupervised learning classifier may be trained to determine classifications of merchant groups and/or classifications of user groups. A merchant group may, based on the classification, indicate one or more merchants that are recommended for registration. A user group may, based on the classification, indicate one or more users that have similar preferences as the user. The user group may be associated with a listing of merchants that are recommended for registration. Based on the unsupervised learning classifier's classification, the user may be able to select which merchants to register the payment card.

The payment card may be registered based on virtual payment card information. The virtual payment card information may be configured to initiate transactions only with the merchant. In this way, if the virtual payment card information is used in an attempt to initiate a transaction with a different merchant, the payment card issuer may deny the transaction. Further, the virtual payment card information may be different from an identifier of the payment card. As one example, the virtual payment card information may not include a number of the payment card (e.g., the virtual payment card information may not include the credit card number or debit card number). In this way, if the virtual payment card information is provided to a third party, the third party may not gain knowledge of the number of the payment card.

Registering the payment card may include, among other things, determining the virtual payment card information and configuring the user's account with the payment card issuer to include an indication of the virtual payment card information. Registering the payment card may further include communicating with a computing system of the merchant to store the virtual payment card information as part of the user's account at the merchant. Once registered, the user may be able to initiate a transaction to purchase goods or services via the merchant using the virtual payment card information. The payment card issuer may complete the transaction by determining the user's account based on the virtual payment card information and charging a purchase price for the goods or services to the user's account. Additional examples and additional details of the unsupervised learning classifier and the virtual payment card information will be discussed below in connection with FIGS. 1-5.

Based on the above discussion, this disclosure includes discussion of various user accounts. For example, a user may have an account with a payment card issuer and the user may have one or more accounts at one or more merchants. For clarity, a user's account with a payment card issuer may be referred interchangeably herein as a payment card issuer account for the user. A user's account at a merchant may be referred interchangeably herein as a merchant account for the user.

Figure 1:
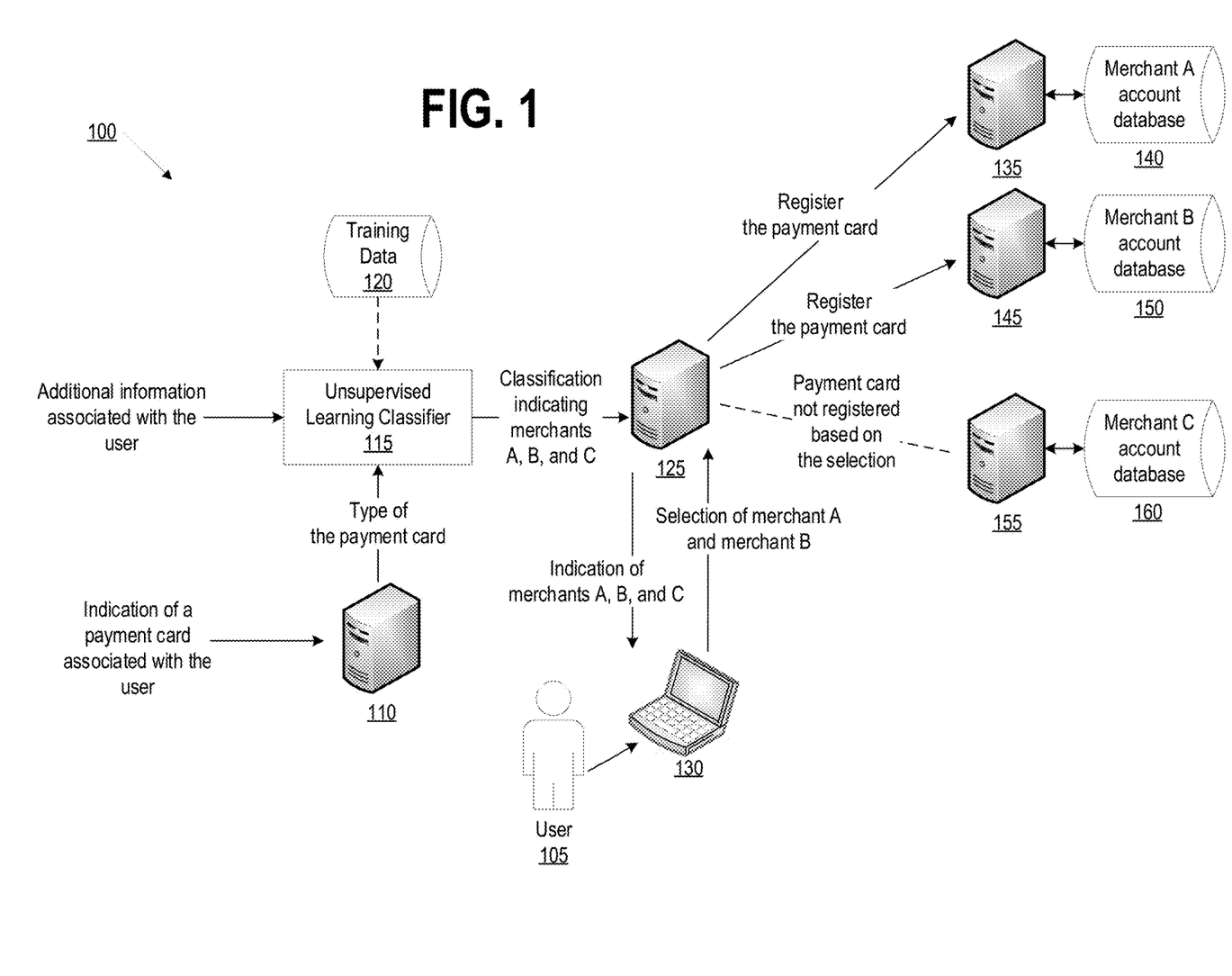
FIG. 1 depicts a block diagram of an example computing environment that may be configured to apply machine learning techniques as part of registering a payment card with one or more accounts of one or more merchants.

FIG. 1 depicts a block diagram of an example computing environment 100 that may be configured to apply machine learning techniques as part of registering a payment card with one or more accounts of one or more merchants. The example computing environment 100 includes computing devices 110 and 125 configured to cause registration of a payment card with one or more merchants. As depicted in FIG. 1, computing device 125 may be configured to register a payment card with any of merchant A (as represented by merchant A's computing device 135 and the merchant A account database 140), merchant B (as represented by merchant B's computing device 145 and the merchant A account database 150), and merchant C (as represented by merchant C's computing device 155 and the merchant A account database 160). As also depicted in FIG. 1, computing device 125 may be configured to communicate with a user 105 via computing device 130; computing device 110 may be configured to receive an indication of a payment card associated with the user 105; and both computing devices 110 and 125 may be configured to communicate with an unsupervised learning classifier 115. The computing devices 110 and 125 may be operated, owned, or otherwise controlled by the payment card issuer. The computing devices 110 and 125 are shown as an example of an arrangement that may be used to register a payment card with a merchant. Other arrangements could similar perform the aspects described herein. For example, a single computing device may perform all of the features described in connection with the computing devices 110 and 125. Additional devices may be used to perform some the features described in connection with the computing devices 110 and 125.

The example computing environment 100 illustrates an example flow for registering a payment card of the user 501 with one or more merchants. In particular, the payment card of the user 501 is shown as being registered with merchant A and merchant B. This example flow will frame the remaining discussion of FIG. 1.

As depicted in FIG. 1, the computing device 110 may receive an indication of a payment card associated with the user 105. The payment card may be one of the payment cards issued by the payment card issuer. This indication may have been received based on the payment card issuer issuing the payment card to the user 105. This indication may have been received based on a policy, or service, of the payment card issuer. For example, this indication may have been received based on a periodic schedule where payment cards are periodically processed to determine merchants to recommend registration. As another example, this indication may have been received based on the user 105 selecting an option for merchant recommendations on the payment card issuer's website.

Based on receiving the indication of the payment card associated with the user 105, the computing device 110 may determine the type of the payment card. The type of the payment card may indicate one or more properties of the payment card. For example, a payment card may be associated with a level (e.g., gold, platinum, and black are examples of levels for some payment cards), one or more rewards (e.g., airline miles, cash-back, and merchant discounts are examples of rewards for some payment cards), one or more payment network processor (e.g., MASTERCARD, VISA, and the like), one or more financial services entities (e.g., CAPITAL ONE, AMERICAN EXPRESS, and the like), and transaction type (e.g., credit, debit, and the like). The type of the payment card may indicate one or more of these properties. For example, the type of the payment card may indicate that the payment card is a platinum level VISA credit card with cash-back rewards that is issued by CAPITAL ONE.

The computing device 110 may send the type of the payment card to the unsupervised learning classifier 115. The unsupervised learning classifier 115 may be able to, based on the type of the payment card, determine a classification of a merchant group and/or a classification of a user group. As depicted in FIG. 1, the unsupervised learning classifier 115 may, based on the type of payment card received from computing device 110, determine a classification that indicates merchant A, merchant B, and merchant C. For example, if the unsupervised learning classifier 115 determines a classification that indicates a merchant group, the member group may include merchant A, merchant B, and merchant C as members. If the unsupervised learning classifier 115 determines a classification that indicates a user group, the user group may be associated with a listing of merchants that includes merchant A, merchant B, and merchant C. Based on this listing, the user group may indicate merchant A, merchant B, and merchant C. If the unsupervised learning classifier 115 determines a first classification that indicates a merchant group and a second classification that indicates a user group, the first and second classifications may indicate the merchant A, merchant B, and merchant C based on those merchants all being members of the merchant group and being included in the listing associated with the user group. The unsupervised learning classifier 115 may determine the classification based on additional information associated with the user 105 including, for example, spending information of the user 105 and/or demographic information of the user 105. The unsupervised learning classifier 115 may determine the classification based on other information not shown in FIG. 1. A more detailed example of the unsupervised learning classifier 115 is provided in connection with FIG. 2.

The unsupervised learning classifier 115 may have been trained based on training data 120. The training may have been performed prior to the example flow illustrated by FIG. 1 (as represented by the dashed line between the unsupervised learning classifier 115 and the training data 120). The training may have been performed using an unsupervised learning technique including, for example, a clustering algorithm, an autoencoding algorithm, a feature separation algorithm, or an expectation-maximization algorithm. The training data 120 may include a one or more sets of data (e.g., payment card information, merchant information, user information, and the like) that are usable to train the unsupervised learning classifier 115 to determine classifications of merchant groups and/or user groups. The unsupervised learning classifier 115 may be configured as part of the computing device 110, the computing device 125, or some other computing device. Further details regarding the training data 120 will be provided in connection with FIG. 2.

As depicted in FIG. 1, the unsupervised learning classifier 115 may provide the classification indicating merchant A, merchant B, and merchant C to the computing device 125. The computing device 125 may be configured to, based on the classification, determine an indication of one or more merchants so that the user 105 may select which merchants to register the payment card. Accordingly, as depicted in FIG. 1, the computing device 125 may send an indication of merchant A, merchant B, and merchant C to the computing device 130. The computing device 130 may be configured to cause display of the indication of merchant A, merchant B, and merchant C. The user 105 may, via the computing device 130 and based on the display of the indication, select which merchants to register the payment card. Accordingly, as depicted in FIG. 1, the computing device 130 may, based on a selection by the user 105, send an indication of selected merchants to the computing device 125. As shown, computing device 130 may send an indication of a selection of merchant A and merchant B. In this way, the user 105 has selected to register the payment card with merchant A and merchant B, but has selected to not register the payment with merchant C.

Based on the selection, the computing device 125 may proceed to register the payment card with the selected merchants. Accordingly, as depicted in FIG. 1, the computing device 125 may proceed to register the payment card with merchant A and merchant B. Registering with a merchant may include communicating with a computing system of the merchant. As shown, the computing device 125 may communicate with the computing system 135 of merchant A to register the payment card with a merchant A account for the user 105 (e.g., by storing, among other things, payment card information or virtual payment card information in the merchant A account database 140). As also shown, the computing device 125 may communicate with the computing system 145 of merchant B to register the payment card with a merchant B account for the user 105 (e.g., by storing, among other things, payment card information or virtual payment card information in the merchant B account database 150). As also shown, the computing device 125 may not communicate with the computing system 155 of merchant C based on the user 105 selecting to not register the payment card with merchant C. Additional details and examples of registering the payment card are provided in connection with FIGS. 3 and 4.

In connection with registering the payment card at merchant A and merchant B, the computing device 125 may be configured to determine virtual payment card information for each of merchant A and merchant B. For example, the virtual payment card information for merchant A may be a hash of an identifier of merchant A (e.g., an address of merchant A's website) and an identifier of the payment card (e.g., a number of the payment card). As part of registering the payment card with merchant A, the virtual payment card information may be stored in merchant A account database 140. As another example, the virtual payment card information for merchant B may be a hash of an identifier of merchant B (e.g., an address of merchant A's website) and an identifier of the payment card (e.g., a number of the payment card). As part of registering the payment card with merchant B, the virtual payment card information may be stored in merchant B account database 150. Additional details and examples of the virtual payment card information are provided in connection with FIG. 4.

Once the payment card is registered, the user 105 may be able to visit the respective websites of merchant A and merchant B, login to their accounts via the respective websites, and initiate a transaction with merchant A and merchant B using the payment card that is registered to their accounts. For example, if merchant A is an online book store, the user 105 may visit the website of the online book store, login to their account at the online book store, and initiate a transaction to purchase a book offered for sale by the online book store using the payment card. The online book store would then communicate with the payment card issuer (e.g., by sending any stored payment card information and/or virtual payment card information to the payment card issuer) and the payment card issuer may complete the transaction by charging a purchase price of the book to a payment issuer account for the user 105. A similar process may be performed if the user 105 visits the website of merchant B to purchase a good or service offered by merchant B.

Figure 2:
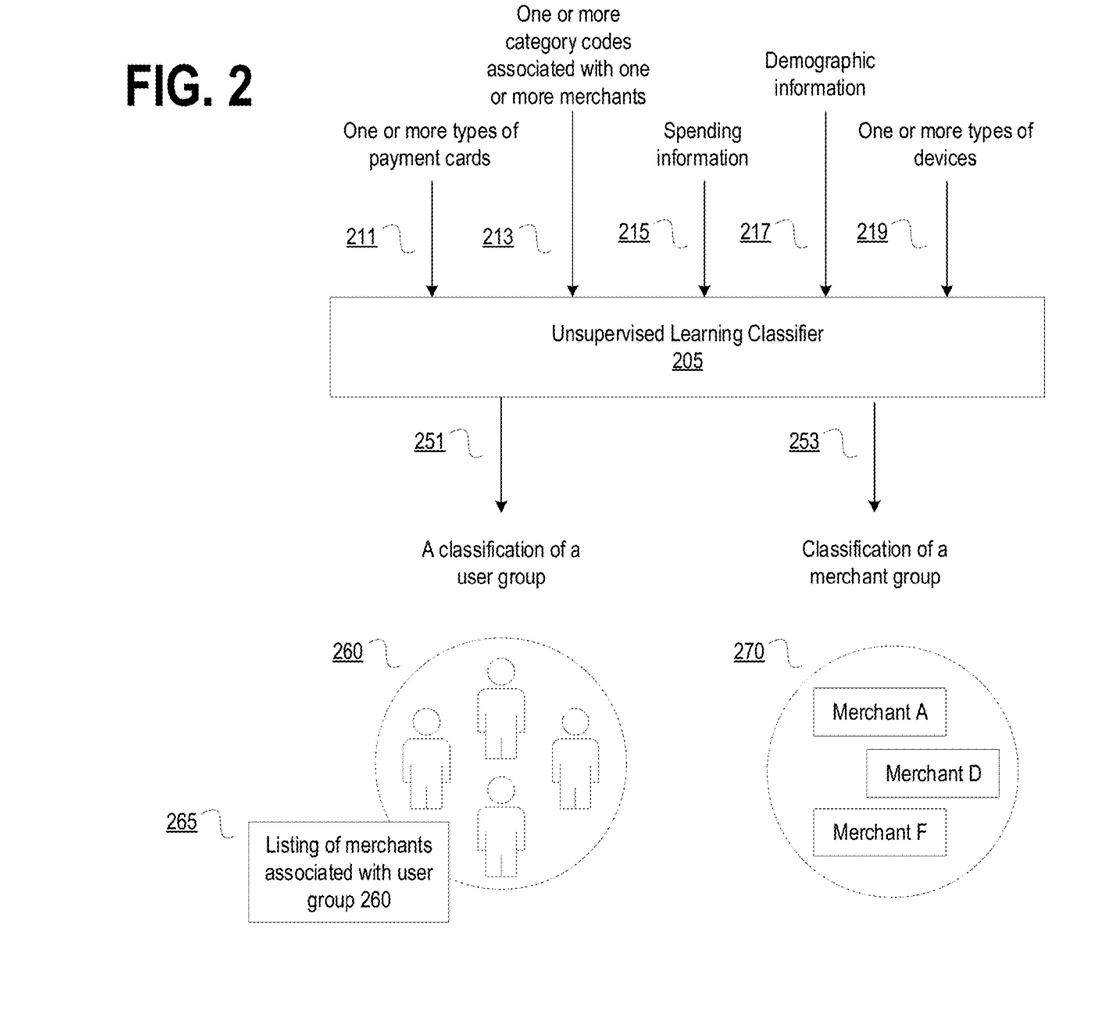
FIG. 2 depicts an example block diagram of an unsupervised learning classifier that is in accordance with one or more aspects described herein.

FIG. 2 depicts an example block diagram of an unsupervised learning classifier. The example unsupervised learning classifier 205 of FIG. 2 may be used in the example computing environment of FIG. 1 (e.g., as the unsupervised learning classifier 115). As depicted in FIG. 2, the unsupervised learning classifier 205 may be configured to receive one or more inputs 211-219 and determine, based on the one or more inputs 211-219, one or more classifications 251-253. The one or more inputs 211-219 are shown with examples of the types of data that may be input to the unsupervised learning classifier 205. As shown, the one or more inputs 211-219 may be one or more types of payment cards, one or more category codes associated with one or more merchants, spending information associated with one or more users, demographic information associated with one or more users, and one or more types of devices associated with one or more users.

Each of the one or more types of payment cards may indicate one or more properties of a payment card. Each of the one or more types may be the same, or similar to, the type of payment card sent to the unsupervised learning classifier 105 of FIG. 1 by the computing device 110. For example, a first of the one or more types of payment cards may indicate that a first payment card is a platinum level VISA credit card with cash-back rewards that is issued by CAPITAL ONE. A second of the one or more types of payment cards may indicate that a second payment card a black level AMERICAN EXPRESS credit card.

Each of the one or more category codes associated with one or more merchants may be a merchant category code (MCC) assigned to a merchant based on the merchant's acceptance of payment cards for initiating transactions. An MCC may be assigned to the merchant by a payment network processor. An MCC may indicate one or more types of goods or services offered by the merchant (e.g., a first merchant that offers clothing may be assigned an MCC within the range of 5600-5699; a second merchant that offers electrical parts and equipment may be assigned an MCC of 5065).

The spending information associated with one or more users may indicate, for each of the one or more users, a spending history and/or a transaction history. A spending history may include, for example, amounts of money spent over a time period (e.g., a spending history may indicate a user has spent $10,000 over the course of a year). A transaction history may include, for example, a listing of transactions with various merchants (e.g., a transaction history may include a listing of 300 transactions conducted with 200 different merchants).

The demographic information associated with the one or more users may indicate, for each of the one or more users, one or more user characteristics. Examples of the one or more characteristics include, for example, age, gender, race/ethnicity, citizenship, income, education, employment, marriage status, address information, and the like. Some of the demographic information may be based on a user's application for a payment card.

The one or more types of devices associated with one or more users, for each of the one or more users, a device that is used by the user. For example, if a user uses a computing device with an ANDROID operating system when communicating with a payment card issuer, the type of device for that user may indicate an ANDROID device. As another example, if a user uses a computing device with an operating system by APPLE (e.g., iOS) when communicating with a payment card issuer, the type of device for that user may indicate an APPLE device. As yet another example, if a user uses a computing device with a WINDOWS operating system when communicating with a payment card issuer, the type of device for that user may indicate an WINDOWS device. A type of device associated with a user may be determined based on communications with a computing device associated with a user (e.g., computing device 130 of FIG. 1). The type of device for a user may be determined based on communications from the associated computing device when the user is applying for a payment card.

As also depicted in FIG. 2, the unsupervised learning classifier 205 may be configured to, based on the one or more inputs 211-219, determine one or more classifications 251-253. As shown, the one or more classifications may be a classification of a user group and/or a classification of a merchant group. FIG. 2 includes a depiction of an example user group 260 and an example merchant group 270. The example user group 260 may indicate one or more users that have similar preferences to each other based on the one or more inputs 211-219. The example user group 260 may be associated with an example listing of merchants 265 that are recommended for registration for the example user group 260. The example merchant group 270 may indicate one or more merchants that are recommended for registration based on the one or more inputs 211-219.

To further describe the one or more inputs 211-219 and the one or more classifications 251-253, some examples of training the unsupervised learning classifier 205 and runtime use of the unsupervised learning classifier 205 will be described. The unsupervised learning classifier 205 may be trained using training data (e.g., training data 120 of FIG. 1) and an unsupervised learning technique. The training data may include a set of data for each of the one or more inputs 211-219. For example, the training data may include a first set of data that includes types of payment cards associated with a plurality of users. The types of payment cards may be those offered by the payment card issuer. The plurality of users may be, or otherwise include, users of the payment card issuer (e.g., users having payment cards issued by the payment card issuer). The training data may include a second set of data that includes category codes associated with a plurality of merchants. The training data may include a third set of data that includes spending information for the plurality of users. The plurality of merchants may be determined based on the spending information for the plurality of users (e.g., any merchant indicated within the transaction histories for the plurality of users). The training data may include a fourth set of data that includes demographic information for the plurality of users. The training data may include a fifth set of data that includes types of devices for the plurality of users. The sets of data will be provided, as input, to the unsupervised learning classifier 205 to train the unsupervised learning classifier 205 using an unsupervised learning technique.

An unsupervised learning technique may determine patterns within the training data. Based on the determination of the patterns, the unsupervised learning classifier 205 may be configured to determine the one or more classifications 251-253 for any set of the one or more inputs 211-219 at runtime. In this way, the unsupervised learning classifier 205 may be configured to determine classifications of user groups and/or classifications of merchant groups (e.g., classifications 251-253). Some examples of an unsupervised learning technique may include, for example, a clustering algorithm, an autoencoding algorithm, a feature separation algorithm, or an expectation-maximization algorithm.

At runtime, the unsupervised learning classifier 205 may receive, as input, a particular set of one or more inputs 211-219. Based on the particular set of the one or more inputs, the unsupervised learning classifier 205 may determine a classification of a user group and/or a classification of a merchant group. For example, the unsupervised learning classifier 205 may receive, as input, a type of payment card associated with a user (e.g., as received by the unsupervised learning classifier 113 from the computing device 110 of FIG. 1); one or more category codes associated with one or more merchants; spending information associated with the user (e.g., user 105 of FIG. 1); demographic information associated with the user; and one or more types of devices associated with the user. The one or more merchants may be determined based on the spending information associated with the user. Based on this input, the unsupervised learning classifier 205 may determine a classification 251 of a user group for the user (e.g., example user group 260 may be determined for user 105) and/or a classification 253 of a merchant group (e.g., example merchant group 270 may be determined for user 105). The one or more classifications 251-253 may indicate merchants that are recommended for registration for the user (e.g., based on the listing of merchants 265 associated with the example user group 260 and/or based on the example merchant group 270).

Figure 3:
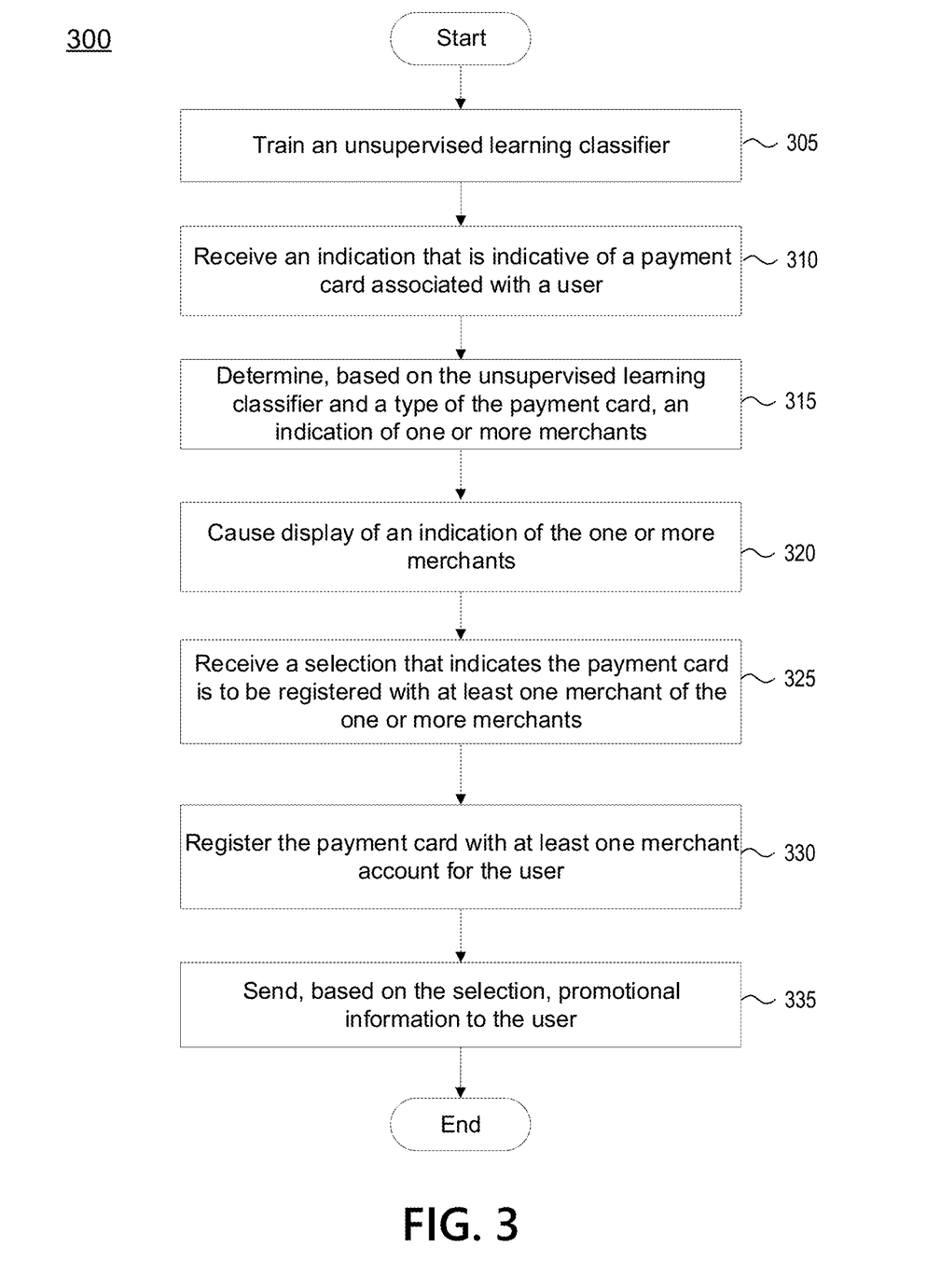
FIG. 3 depicts an example method that includes, based on an unsupervised learning classifier, registers a payment card with at least one account of a merchant.
Figure 4:
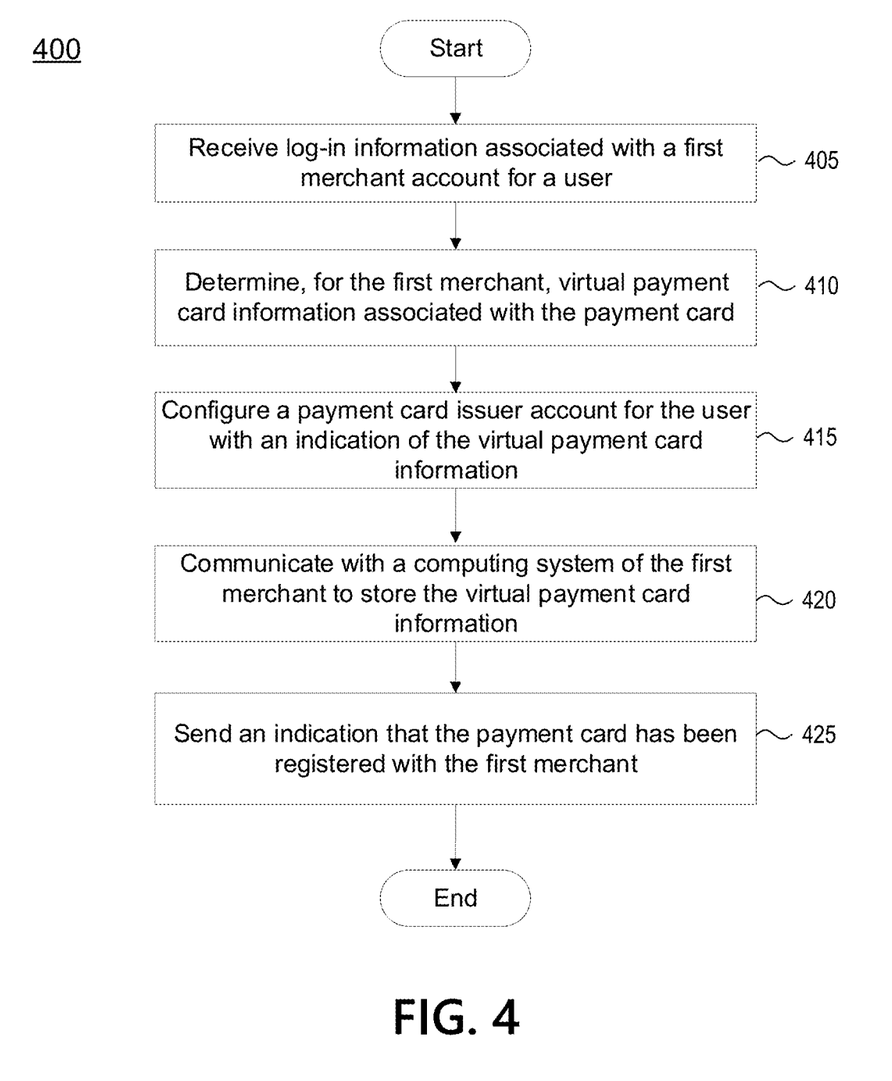
FIG. 4 depicts an example method that includes communication with a computing system of a merchant to register the payment card based on virtual payment card information.

Having discussed the example computing environment 100 of FIG. 1 and the example unsupervised learning classifier 205 of FIG. 2, example methods, which may be performed by various devices of the example computing environment 100, will be discussed. The example methods are depicted at FIGS. 3 and 4. In particular and among other things, the example methods of FIGS. 3 and 4 provide additional details on aspects described in connection with the example computing environment 100 and the unsupervised learning classifier 205. an example method 400 that may be performed by one or more computing devices of the example computing environment 100 (e.g., the computing devices 110 and 125).

FIG. 3 depicts an example method 300 that includes, based on an unsupervised learning classifier, registering a payment card with at least one account of a merchant. Method 300 may be performed by one or more computing devices including, for example, the computing devices 110 and 125. Method 400 may be implemented in suitable computer-executable instructions.

At step 305, the one or more computing devices may train an unsupervised learning classifier. Training an unsupervised learning classifier may be performed by using training data (e.g., training data 120) and an unsupervised learning technique (e.g., as discussed in connection with FIG. 2). Once training is complete, the unsupervised learning classifier may be configured to determine classifications of merchant groups and/or classifications of user groups. The unsupervised learning classifier may be the same, or similar, to those discussed in connection with FIGS. 1 and 2 (e.g., unsupervised learning classifier 113 and unsupervised learning classifier 205).

At step 310, the one or more computing devices may receive an indication that is indicative of a payment card associated with a user. This indication may have been received based on a payment card issuer issuing the payment card to a user (e.g., user 105). This indication may have been received based on a policy, or service, of the payment card issuer. For example, this indication may have been received based on a periodic schedule where payment cards are periodically processed to determine merchants to recommend registration. As another example, this indication may have been received based on the user selecting an option for merchant recommendations on the payment card issuer's website.

At step 315, the one or more computing devices may determine, based on the unsupervised learning classifier and a type of the payment card, an indication of one or more merchants. This determination may include or be performed based on the following example. Beginning the example, the one or more computing devices may determine the type of the payment card based on the indication received at step 310. The type of the payment card may indicate one or more properties associated with the payment card including, for example, a level associated with the payment card (e.g., gold, platinum, black, and the like), a reward associated with the payment card (e.g., airline miles, cash-back, merchant discounts, and the like), a payment network processor associated with the payment card (e.g., MASTERCARD, VISA, and the like), a financial services entity associated with the payment card (e.g., CAPITAL ONE, AMERICAN EXPRESS, and the like), and transaction information associated with the payment card (e.g., credit, debit, and the like).

Continuing the example, the one or more computing devices may provide the type of the payment card, as input, to the unsupervised learning classifier. The one or more computing devices may provide additional information, as input, to the unsupervised learning classifier. The additional information may include any of the data discussed in connection with inputs 213-219 of FIG. 2. For example, the additional information may include one or more of the following: one or more category codes associated with one or more merchants (e.g., one or more MCC codes); spending information associated with the user (e.g., user 105 of FIG. 1); demographic information associated with the user; and one or more types of devices associated with the user. The one or more merchants may be determined based on the spending information associated with the user. Based on the type of the payment card and the additional information, the unsupervised learning classifier may determine a classification of a user group for the user (e.g., example user group 260 may be determined for user 105) and/or a classification of a merchant group (e.g., example merchant group 270 may be determined for user 105). The one or more classifications may indicate merchants that are recommended for registration for the user (e.g., based on the listing of merchants 265 associated with the example user group 260 and/or based on the example merchant group 270).

Continuing the example, the one or more computing devices may determine the indication of the one or more merchants based on the one or more classifications of the unsupervised learning classifier. For example, the indication of the one or more merchants may be determined based on a listing of merchants associated with the user group (e.g., the one or more merchants may be those indicated by the listing of merchants 265). The indication of the one or more merchants may be determined based on the merchant group (e.g., the one or more merchants may be those indicated by the example merchant group 270). The indication of the one or more merchants may be determined based on both the user group and the merchant group (e.g., the one or more merchants may be those indicated by both the listing of merchants 265 and the example merchant group 270).

At step 320, the one or more computing devices may cause display of the indication of the one or more merchants. Causing display of the indication of the one or more merchants may include sending the indication of the one or more merchants to a computing device associated with the user (e.g., computing device 130 of FIG. 1). Upon receipt, the computing device may generate a display of the indication of the one or more merchants.

At step 325, the one or more computing devices may receive a selection that indicates the payment card is to be registered with at least one merchant of the one or more merchants. This selection may be received from the computing device associated with the user. For example, the user, based on the display of the indication of the one or more merchants, may input a selection of at least one merchant from those displayed. The computing device associated with the user may send the selection to the one or more computing devices. As one particular example, the display may include three merchants (e.g., a first merchant, a second merchant, and a third merchant). The user may select two of the displayed merchants for registration (e.g., the payment card is to be registered at the first merchant and the second merchant). Accordingly, the user did not select the remaining merchant (e.g., the payment card is not to be registered at the third merchant). Based on this example, the one or more computing may receive, from the computing device associated with the user, a selection that indicates the payment card is to be registered at the two merchants (e.g., a selection that indicates the payment card is to be registered at the first merchant and the second merchant).

At step 330, the one or more computing devices may register the payment card with at least one merchant account for the user. In other words, the one or more computing devices may register the payment card with an account at each merchant indicated by the selection received at step 325 (e.g., register with an account at the first merchant and register with an account at the second merchant). The registration may include or be performed based on the following example. For simplicity, the example will be to register the payment card at a first merchant account (e.g., an account at merchant A for user 105). The one or more computing devices may send, to the computing device associated with the user, a request for login information to an account at the first merchant. The login information may include a username and a password for the user's account at the first merchant. The login information may be input by the user at the computing device. Based on the request, the one or more computing devices may receive the login information. Based on the login information, the one or more computing devices may communicate with a computing system of the first merchant, gain access to the user's account at the first merchant, and store the payment card information as part of the user's account at the first merchant (e.g., store the payment card information in the merchant A database 140). The payment card information may include, for example, an identifier of the payment card (e.g., a credit card number), an expiration date of the payment card, a security code of the payment card, a zip code for the user, an address for the user, and the like. Based on the stored payment card information, the user may be able to visit the first merchant's website and initiate a transaction, using the stored payment card information, to purchase a good or service offered by the first merchant.

An additional example of registering the payment card with at least one merchant account for the user is provided in connection with FIG. 4. In particular, the additional example provided in connection with FIG. 4 is related to registering the payment card with at least one merchant based on virtual payment card information. Accordingly, step 335 may include or be performed based on the example method of FIG. 4.

At step 335, the one or more computing devices may, based on the selection received at step 325, send promotional information to the user. The promotional information may be sent to a computing device associated with the user (e.g., computing device 130). The promotional information may include coupons, advertisements, offers for goods or services, and the like. For example, based on the selection received at step 325, the one or more computing devices may send an advertisement for a new payment card to the user. This advertisement may be determined based on any of the merchants indicated by the selection (e.g., if a selected merchant is an airline company, the advertisement may be for a credit card that has a reward for airline miles). As another example, based on the selection received at step 325, the one or more computing devices may send a discount coupon for a promoted merchant to the user (e.g., if a selected merchant is a clothes store, the discount coupon may be for the selected merchant or a competing merchant that also offers clothes). The promotional information may be in the form of an email, text message, or the like.

FIG. 4 depicts an example method 400 that includes communication with a computing system of a merchant to register the payment card based on virtual payment card information. Method 400 may be performed by one or more computing devices including, for example, the computing devices 110 and 125. Method 400 may be implemented in suitable computer-executable instructions. Additionally, method 400 may be performed as part of registering a payment card with at least one merchant (e.g., method 400 may be performed as part of step 330 of FIG. 3).

At step 405, the one or more computing devices may receive login information associated with a first merchant account for a user. The login information may include a username and a password for the first merchant account. The login information may have been input by the user at a computing device associated with the user (e.g., computing device 130 of FIG. 1) and sent to the one or more computing devices by the computing device associated with the user. The login information may be usable to gain access to the first merchant account.

Step 405 may involve the last user input received from the user during the registration of a payment card. Accordingly, steps 410-425 of method 400 may be performed without receiving additional user input from the user. For example, the communication with the computing system of the first merchant, which is performed at step 410, may be performed without receiving additional user input from the user.

At step 410, the one or more computing devices may determine, for the first merchant, virtual payment card information associated with the payment card. The virtual payment card information may be determined by a hash of an identifier of the first merchant (e.g., an address of first merchant's website) and an identifier of the payment card (e.g., a number of the payment card). The virtual payment card information may be configured to initiate, for the user and the first merchant, a transaction using the payment card. In this way, if the virtual payment card information is used in an attempt to initiate a transaction with a merchant different from the first merchant, the payment card issuer may deny the transaction. Further, the virtual payment card information may be different from an identifier of the payment card. As one example, the virtual payment card information may not include a number of the payment card (e.g., the virtual payment card information may not include the credit card number or debit card number). In this way, if the virtual payment card information is provided to a third party, the third party may not gain knowledge of the number of the payment card.

At step 415, the one or more computing devices may configure a payment card issuer account for the user with an indication of the virtual payment card information. This configuring may include storing an indication of the virtual payment card information with the payment card issuer account for the user. This configuring may also include storing an indication of the first merchant in association with the virtual payment card information. The payment card issuer account for the user may be the user's account that is charged based on use of the payment card. By configuring the payment card issuer account in this manner, the payment card issuer may be able to complete transactions that are initiated based on the virtual payment card information. For example, if the user initiates a transaction to purchase a good or service from the first merchant, the first merchant may send the virtual payment information to the payment card issuer. Based on the virtual payment information being stored as part of the payment issuer account, the payment card issuer may determine the payment issuer account for the user. Further, based on the virtual payment information and its association with the first merchant, the payment card issuer may complete the transaction by charging a purchase price for the good or service to the payment card issuer account.

At step 420, the one or more computing devices may communicate with a computing system of the first merchant to store the virtual payment card information. The communication may be performed based on the login information received at step 405. For example, the one or more computing devices may communicate with the computing system of the first merchant to gain access to the first merchant account for the first user based on the login information. After gaining access to the first merchant account for the user, the one or more computing devices may cause the computing system of the first merchant to store the virtual payment card information as part of the first merchant account. Based on the stored virtual payment card information, the user may be able to visit the first merchant's web site and initiate a transaction, using the stored virtual payment card information, to purchase a good or service offered by the first merchant.

At step 425, the one or more computing devices may send an indication that the payment card has been registered with the first merchant. This indication may be sent to a computing device associated with the user (e.g., computing device 130). The indication may be in the form of an email, text message, or the like.

Figure 5:
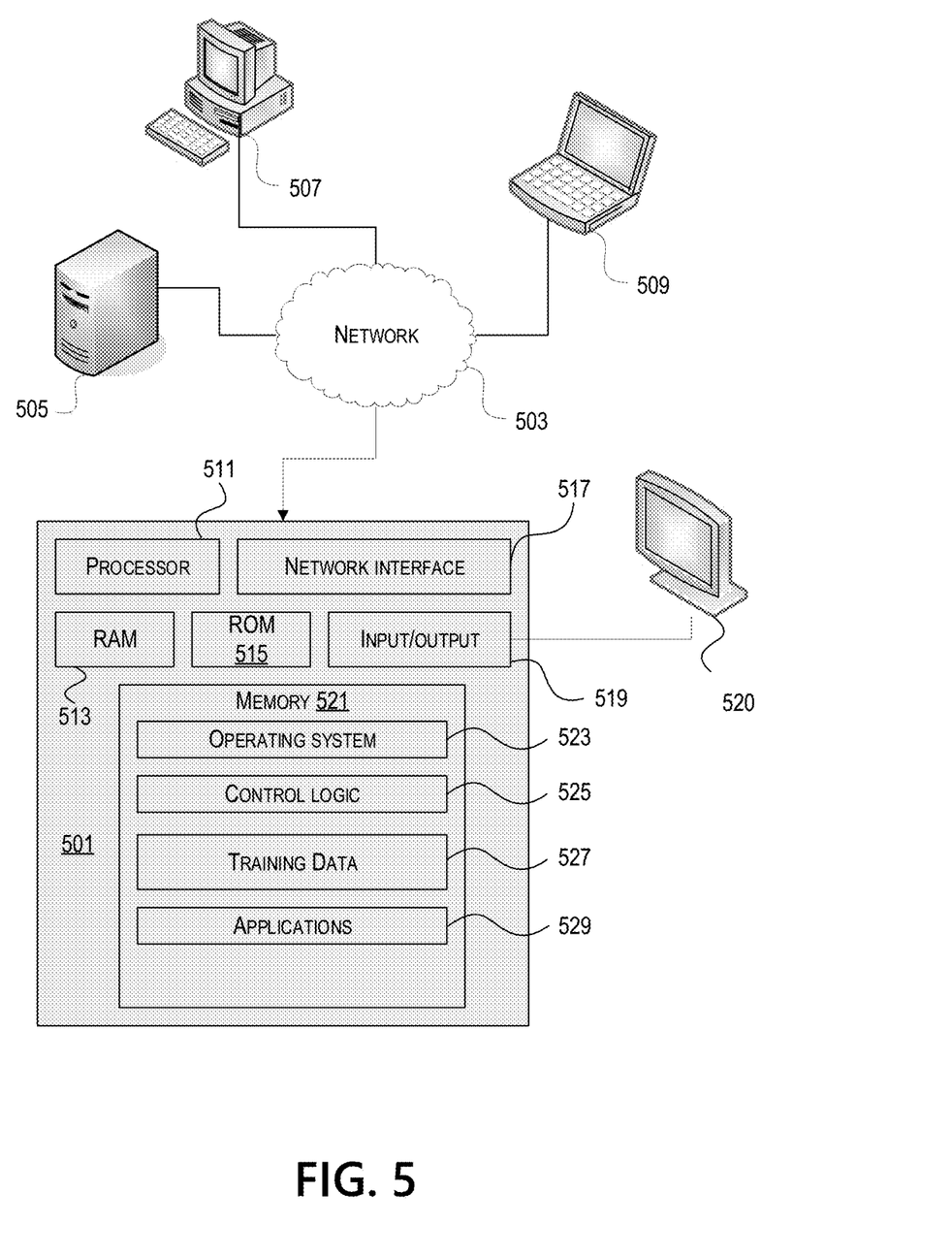
FIG. 5 depicts an example of a computing device that may be used in implementing one or more aspects described herein.

FIG. 5 illustrates one example of a computing device 501 that may be used to implement one or more illustrative aspects discussed herein. For example, computing device 501 may, in some embodiments, implement one or more aspects of the disclosure by reading and/or executing instructions and performing one or more actions based on the instructions. Computing device 501 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 501 may, in some embodiments, operate in a standalone environment. In others, computing device 501 may operate in a networked environment. As shown in FIG. 5, various network nodes 501, 505, 507, and 509 may be interconnected via a network 503, such as the Internet. Other networks may also or alternatively be used, including private intranets, corporate networks, LANs, wireless networks, personal networks (PAN), and the like. Network 503 is for illustration purposes and may be replaced with fewer or additional computer networks. A local area network (LAN) may have one or more of any known LAN topology and may use one or more of a variety of different protocols, such as Ethernet. Devices 501, 505, 507, 509 and other devices (not shown) may be connected to one or more of the networks via twisted pair wires, coaxial cable, fiber optics, radio waves or other communication media.

As seen in FIG. 5, computing device 501 may include a processor 511, RAM 513, ROM 515, network interface 517, input/output interfaces 519 (e.g., keyboard, mouse, display, printer, etc.), and memory 521. Processor 511 may include one or more computer processing units (CPUs), graphical processing units (GPUs), and/or other processing units such as a processor adapted to perform computations associated with speech processing or other forms of machine learning. I/O 519 may include a variety of interface units and drives for reading, writing, displaying, and/or printing data or files. I/O 519 may be coupled with a display such as display 520. Memory 521 may store software for configuring computing device 501 into a special purpose computing device in order to perform one or more of the various functions discussed herein. Memory 521 may store operating system software 523 for controlling overall operation of computing device 501, control logic 525 for instructing computing device 501 to perform aspects discussed herein, training data 527 (e.g., for training the unsupervised learning classifier), and one or more applications 529. In other embodiments, computing device 501 may include two or more of any and/or all of these components (e.g., two or more processors, two or more memories, etc.) and/or other components and/or subsystems not illustrated here.

Devices 505, 507, 509 may have similar or different architecture as described with respect to computing device 501. Those of skill in the art will appreciate that the functionality of computing device 501 (or device 505, 507, 509) as described herein may be spread across multiple data processing devices, for example, to distribute processing load across multiple computers, to segregate transactions based on geographic location, user access level, quality of service (QoS), etc. For example, devices 501, 505, 507, 509, and others may operate in concert to provide parallel computing features in support of the operation of control logic 525 and/or speech processing software 527.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although the subject matter has been described in language specific to structural features and/or methodological acts, it is to be understood that the subject matter defined in any claim is not necessarily limited to the specific features or acts described above. Rather, the specific features and acts described above are disclosed as example forms of implementing any claim or any of the appended claims.

The invention claimed is:

1. A method comprising:
    training an unsupervised learning classifier, wherein, after the training, the unsupervised learning classifier is configured to determine classifications indicating merchant groups and/or user groups;
    registering, for a user and using one or more computing devices associated with a payment card issuer, a payment card with one or more merchants, wherein registering the payment card comprises:
        determining, by the one or more computing devices, based on the unsupervised learning classifier, based on a type of the payment card, and based on information associated with the user, an indication of the one or more merchants;
        causing, by the one or more computing devices, display of the indication of the one or more merchants to enable the user to select which of the one or more merchants the payment card issuer is to register the payment card;
        receiving, by the one or more computing devices, based on first user input from the user and based on the indication of the one or more merchants, a first selection indicating the payment card is to be registered with a first merchant of the one or more merchants;
        receiving, by the one or more computing devices and based on second user input from the user, first login information for accessing, via a second computing system of the first merchant that provides a first website of the first merchant, a first merchant account of the user;
        causing the one or more computing devices to access, based on the first selection and on communicating with a second computing system of the first merchant, the first merchant account using the first login information;
        causing payment card information associated with the payment card to be stored as part of the first merchant account; and
        wherein after the payment card is registered with the first merchant and the user is logged into the first website, the user is enabled to initiate a transaction using the payment card information that is stored as part of the first merchant account for the user.

2. The method of claim 1, wherein the payment card is associated with a number that is unique to the payment card, wherein the payment card information includes the number.

3. The method of claim 1, wherein the payment card is associated with a number that is unique to the payment card, wherein the payment card information includes virtual payment card information that is different from the number.

4. The method of claim 3, further comprising:
    determining, for the first merchant, the virtual payment card information, wherein the virtual payment card information is configured to initiate, for the user and the first merchant, the transaction using the payment card; and
    configuring a payment card issuer account for the user with an indication of the virtual payment card information.

5. The method of claim 1, wherein registering the payment card with the first merchant is performed without receiving third user input from the user.

6. The method of claim 1, wherein the training is performed based on spending information associated with users of the payment card issuer.

7. The method of claim 1, wherein the training is performed based on user demographic data associated with users of the payment card issuer and based on one or more category codes associated with the one or more merchants.

8. The method of claim 1, wherein the training is performed based on one or more types of devices associated with users of the payment card issuer.

9. The method of claim 1, further comprising:
    based on the first selection, sending, to a computing device associated with the user, promotional information associated with the first merchant.

17

10. The method of claim 1, further comprising:
based on the first selection, sending, to a computing device associated with the user, promotional information that indicates a second payment card different from the payment card.

11. The method of claim 1, wherein the transaction is for the user purchasing an item via the first website at a purchase price, and wherein the method further comprises:
after the payment card is registered with the first merchant, sending, to a computing device associated with the user, an indication that the payment card has been registered with the first merchant; and
receiving, as part of a process for performing the transaction, an indication of the payment card information; and
based on receiving the indication of the payment card information and as part of the process for performing the transaction, charging the purchase price to a payment issuer account for the user.

12. The method of claim 1, wherein the training is performed based on a clustering algorithm, an autoencoding algorithm, a feature separation algorithm, or an expectation-maximization algorithm;
wherein, after the training, the unsupervised learning classifier is configured to determine classifications indicating the user groups; and
wherein determining the indication of the one or more merchants is based on the unsupervised learning classifier indicating a classification of a first user group and further based on a listing of merchants that associates the one or more merchants with the first user group.

13. One or more non-transitory media storing instructions that, when executed, cause one or more computing devices to perform steps comprising:
training an unsupervised learning classifier, wherein, after the training, the unsupervised learning classifier is configured to determine classifications indicating merchant groups and/or user groups;
registering, for a user and using one or more computing devices associated with a payment card issuer, a payment card with one or more merchants, wherein registering the payment card comprises:
determining, based on the unsupervised learning classifier, based on a type of the payment card, and based on information associated with the user, an indication of the one or more merchants;
causing display of the indication of the one or more merchants to enable the user to select which of the one or more merchants the payment card issuer is to register the payment card;
receiving, based on first user input from the user and based on the indication of the one or more merchants, a first selection indicating the payment card is to be registered with a first merchant of the one or more merchants;
receiving, based on second user input from the user, first login information for accessing, via a second computing system of the first merchant that provides a first website of the first merchant, a first merchant account of the user; and
causing the one or more computing devices to access, based on the first selection and on communicating with a second computing system of the first merchant, the first merchant account using the first login information;

18 causing payment card information associated with the payment card to be stored as part of the first merchant account; and
wherein after the payment card is registered with the first merchant and the user is logged into the first website, the user is enabled to initiate a transaction using the payment card information that is stored as part of the first merchant account for the user.

14. The one or more non-transitory media of claim 13, wherein registering the payment card with the first merchant is performed without receiving third user input from the user.

15. The one or more non-transitory media of claim 13, wherein the training is performed based on spending information associated with users of the payment card issuer.

16. The one or more non-transitory media of claim 13, wherein the transaction is for the user purchasing an item via the first website at a purchase price, and wherein the instructions that, when executed, cause one or more computing devices to perform steps further comprising:
after the payment card is registered with the first merchant, sending, to a computing device associated with the user, an indication that the payment card has been registered with the first merchant; and
receiving, as part of a process for performing the transaction, an indication of the payment card information; and
based on receiving the indication of the payment card information and as part of the process for performing the transaction, charging the purchase price to a payment issuer account for the user.

17. The one or more non-transitory media of claim 13, wherein the training is performed based on a clustering algorithm, an autoencoding algorithm, a feature separation algorithm, or an expectation-maximization algorithm;
wherein, after the training, the unsupervised learning classifier is configured to determine classifications indicating the user groups; and
wherein determining the indication of the one or more merchants is based on the unsupervised learning classifier indicating a classification of a first user group and further based on a listing of merchants that associates the one or more merchants with the first user group.

18. A system comprising:
a first computing device that comprises:
one or more first processors; and
first memory storing instructions that, when executed by the one or more first processors, cause the first computing device to perform steps comprising:
training an unsupervised learning classifier, wherein, after the training, the unsupervised learning classifier is configured to determine classifications indicating merchant groups and/or user groups; and
a second computing device that comprises:
one or more second processors; and
second memory storing second instructions that, when executed by the one or more second processors, cause the second computing device to perform steps comprising:
registering, for a user and using one or more computing devices associated with a payment card issuer, a payment card with one or more merchants, wherein registering the payment card comprises:
determining, based on the unsupervised learning classifier, based on a type of the payment card, and based on information associated with the user, an indication of the one or more merchants;

causing display of the indication of the one or more merchants to enable the user to select which of the one or more merchants the payment card issuer is to register the payment card;

receiving, based on first user input from the user and based on the indication of the one or more merchants, a first selection indicating the payment card is to be registered with a first merchant of the one or more merchants;

receiving, based on second user input from the user, first login information for accessing, via a third computing device that provides a first website of the first merchant, a first merchant account of the user; and causing the one or more computing devices to access, based on the first selection and on communicating with a second computing system of the first merchant, the first merchant account using the first login information;

causing payment card information associated with the payment card to be stored as part of the first merchant account; and wherein after the payment card is registered with the first merchant, and the user logged into the first website, the user is enabled to initiate a transaction using the payment card information that is stored as part of the first merchant account for the user.

19. The system of claim 18, wherein the transaction is for the user purchasing an item via the first website at a purchase price, and wherein the instructions that, when executed, cause the second computing device to further perform steps comprising:

after the payment card is registered with the first merchant, sending, to a computing device associated with the user, an indication that the payment card has been registered with the first merchant; and receiving, as part of a process for performing the transaction, an indication of the payment card information; and based on receiving the indication of the payment card information and as part of the process for performing the transaction, charging the purchase price to a payment issuer account for the user.

20. The system of claim 18, wherein the training is performed based on a clustering algorithm, an autoencoding algorithm, a feature separation algorithm, or an expectation-maximization algorithm;

wherein, after the training, the unsupervised learning classifier is configured to determine classifications indicating the user groups; and wherein determining the indication of the one or more merchants is based on the unsupervised learning classifier indicating a classification of a first user group and further based on a listing of merchants that associates the one or more merchants with the first user group.

* * * * *